United States Patent [19]
Roget et al.

[11] 3,957,648
[45] May 18, 1976

[54] APPARATUS FOR THE FRACTIONATION OF FLUIDS

[75] Inventors: Jean Roget, Lyon; Michel Salmon; Bernard Vogt, both of Rhone, all of France

[73] Assignee: Rhone-Poulenc S.A., Paris, France

[22] Filed: Jan. 18, 1974

[21] Appl. No.: 434,652

[30] Foreign Application Priority Data
Jan. 18, 1973 France .............................. 73.01736

[52] U.S. Cl. ............................ 210/321 R; 210/494; 264/258; 210/321 A; 210/321 B
[51] Int. Cl.² ......................................... B01D 31/00
[58] Field of Search ............... 264/41, 49, 258, 177, 264/277, 279, 200; 210/22, 494, 23, 321, 500; 55/16, 158

[56] References Cited
UNITED STATES PATENTS

| | | | |
|---|---|---|---|
| 3,557,962 | 1/1971 | Kohl | 210/500 X |
| 3,690,465 | 9/1972 | McGinnis et al. | 210/494 X |

*Primary Examiner*—Frank A. Spear, Jr.
*Attorney, Agent, or Firm*—Stevens, Davis, Miller & Mosher

[57] ABSTRACT

Fluid fractionating apparatus and a unit for use therein, the unit being positionable in a jacket having at least one fluid inlet and at least one fluid outlet, the unit including at least one leakproof band wound up in the form of a spiral cylinder, the turns of which are radially spaced from one another. A multiplicity of hollow fibres are wound around the turns of the spiral cylinder and extend therebetween. Two end walls extend perpendicular to the axis of the spiral cylinder, and may be formed of a solidified glue, the walls being located one at each end of the cylinder and firmly fixed to the leakproof band of the hollow fibres, at least some of the fibres crossing right through at least one of the end walls and opening on the side thereof outside the spiral cylinder. An opening, which may be provided with a hollow mandrel extending into the interior of the innermost turn of the spiral, is used for feeding the fluid thereto or removing it therefrom.

The unit element may be formed by winding a plurality of hollow fibres around a leakproof band, coiling the leakproof band together with the hollow fibres into a cylindrical spiral, gluing the ends of the spiral cylinder thus produced and cutting the ends of the hollow fibres.

22 Claims, 16 Drawing Figures

APPARATUS FOR THE FRACTIONATION OF FLUIDS

The present invention relates to an apparatus for the fractionation of fluids, comprising hollow fibres, and relates more particularly to a unit fractionation element having the hollow fibres, this element preferably being removable from the said apparatus.

The fractionation operations essentially exchange operations (dialysis, especially the artificial kidney, direct osmosis, gas-gas exchanges and liquid-gas exchanges) and separation operations (ultrafiltration, reverse osmosis and gas permeation); these operations can of course be enriching operations.

Numerous apparatuses exist which have, as the membranes, fibres which are hollow over their entire length. In the first apparatuses described, the fibres (or small tubes) were rather far apart from one another [C. J. Walters — Petroleum Refiner 38 (5) 147–151 (1959)] and U.S. Pat. No. 2,972,349 and because of this the surface area of exchange or separation per unit volume was rather low. The fibres were then arranged as a plurality of bundles, practically all the fibres inside an elementary bundle touching one another at the ends of the bundle and being connected at the ends by resin which is impermeable to fluids (compare French Pat. Nos. 1,307,979 and 1,227,030). In these last apparatuses, when liquids are treated, especially in ultrafiltration or reverse osmosis, the liquid under pressure can be made to flow inside or outside the fibres. When the process is carried out with the liquid under pressure flowing inside the fibres, there are risks that the channel of each fibre will be choked or clogged, especially with viscous or turbid products. It is thus of value to work with the liquid under pressure flowing outside the fibres, but the problem arises of causing the liquid under pressure to sweep correctly over the majority of the fibres. In this case, it is necessary to provide devices which ensure a form of distribution of this liquid outside the fibres, whether it be for an exchange operation or a separation operation.

Solutions have been proposed, especially in French Application No. 2,006,486 in which the small tubes of a haemo-dialyser are separated by a lattice made of non-woven plastic which prevents their contact and ensures better distribution of the dialysis liquid outside the small tubes.

Another solution has been provided by French Application No. 2,024,279 in which flow perpendicular to the fibres and radial relative to the axis of the bundle considered is produced in a U-shaped bundle consisting solely of hollow fibres by means of a tube with a multiplicity of perforations placed inside the said bundle, the perforations being spaced out around the circumference of the tube.

An improvement to the above solution was provided by French Application No. 2,111,382 which also describes an apparatus in which the liquid under pressure flows outside a bundle, this flow also being perpendicular to the fibres and radial relative to the axis of the bundle, by means of a tube with a multiplicity of perforations. This improvement consists of distributing the fibres in webs on either side of a perforated support.

According to the present invention we provide a unit element for use especially in fluid fractionating apparatuses, said unit element comprising at least one band which is leakproof to the fluid to be treated, and which is wound up in the form of a spiral cylinder, the turns of this spiral being radially spaced from one another, a multiplicity of hollow fibres, the majority of which are placed inside the spiral cylinder between its turns, two end walls substantially perpendicular to the axis of the spiral cylinder located one at each end of the cylinder each of the two walls being firmly fixed to the leakproof band, and to the hollow fibres, at least some of the hollow fibres crossing right through at least one of the end walls and opening on the side of said at least one wall out-side the spiral cylinder and an opening in at least one of the end walls to open into the interior of the innermost turn of the spiral.

Preferably a hollow mandrel is passed through the orifice or orifices in the end wall and is provided with one or more perforations, the mandrel being placed at the centre of the spiral cylinder parallel to its axis.

The invention also relates to a fractionation apparatus comprising at least one unit element as defined above, surrounded by a jacket, at least one fluid inlet passage for the jacket and at least one fluid outlet passage, one of said inlet passage and said outlet passage being connected to said opening.

It is to be understood that, in the present description the expression "hollow fibres" denotes fibres of tubular shape, that is to say fibres which possess within them a continuous channel located substantially along the axis of the fibre and free from macromolecular material.

The hollow fibres which can be used according to the invention can be of any known type, and in particular they can be the fibres mentioned in French Patent Nos. 1,307,979, 1,586,563 and 2,017,387 and U.S. Pat. No. 3,674,628, or they can be glass fibres; these fibres can be homogeneous or microporous or anisotropic (that is to say "with a skin"); they can be produced by a melt method, by a dry method (evaporation of the solvent) or by a wet method (coagulation); the spinnerets employed are in practice sector spinnerets or spinnerets which have an annular orifice. The fibres which can be used according to the invention usually have an external diameter which is generally less than 1 mm and preferably less than 0.6 mm, and which can even be between 5 and $100\mu$.

The exact nature of the hollow fibres is chosen as a function of the application considered (dialysis, ultrafiltration, gas—gas or gas-liquid exchanges and the like).

In the fractionation apparatuses (separation and/or exchange) according to the invention, the fluid outside the hollow fibres flows in a direction which is perpendicular or oblique with respect to these hollow fibres, between the turns formed by the leakproof band, and along a spiral circuit going from the inside of the spiral coil towards the outside, or vice versa.

The end walls mentioned above are also called leakproof because, at least in the case of one of them, they separate (in a leakproof manner, of course) the fluids flowing inside the hollow fibres from the fluids flowing outside the hollow fibres; moreover, they force the fluid outside the hollow fibres to follow a spiral path, preventing it from passing direct from one turn to the other via a radial path.

In order that the present invention will be better understood, the following description is given, merely by way of example, reference being made to the accompanying drawings, in which:

FIGS. 13a and 13b represent a particular arrangement for the hollow fibres relative to the band, the latter being itself a different type from the bands described in the preceding figures. FIG. 13a shows this arrangement along a transverse cross-section XIIIa—XIIIa of FIG. 13b and FIG. 13b shows this arrangement plan.

Figures 1, 2:
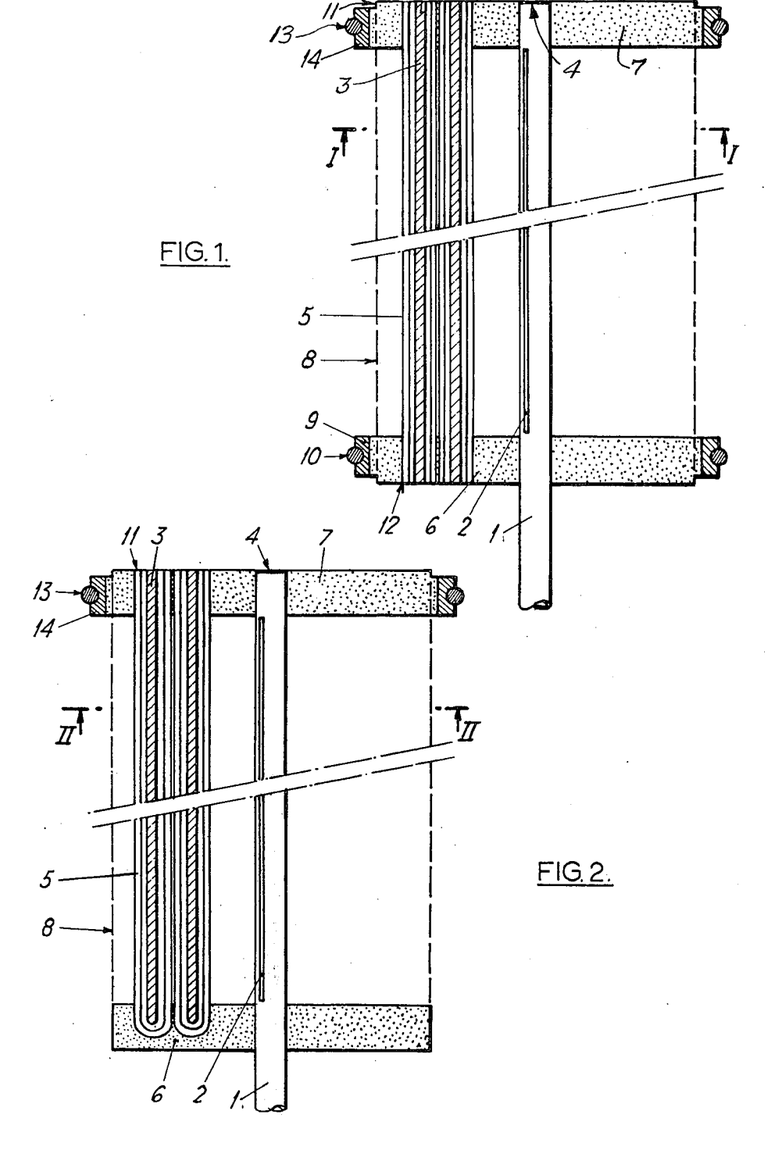
FIGS. 1 to 4 represent, in cross-section, four embodiments of a unit element with hollow fibres according to the invention.

More specifically, the unit element of FIG. 1 comprises a hollow mandrel 1 closed at one end 4, having at least one longitudinal slit 2, a leakproof band 3 wound up in a spiral round the said mandrel 1, and hollow fibres 5 between two consecutive turns of the band 3.

The leakproof band is simultaneously thin (usually 0.1 to 10 mm and preferably 0.5 to 4 mm) and preferably rather flexible in order that it can be wound up in a spiral. Preferably, it consists of an artificial or synthetic polymer film, for example, polyethylene, polyvinyl chloride, polypropylene, polyesters (polyethylene glycol terephthalate), cellulose, cellulose acetate and the like. This band is leakproof to the fluids treated under the working conditions considered.

The hollow fibres are, in this case, parallel to the mandrel 1 and to the generatrices of the spiral cylinder formed by the leakproof band 3; they pass right through each of the two end walls 6 and 7 and are open at 11 and 12 on the external surface of these walls.

In FIG. 1, only a few hollow fibres and a few cross-sections of turns of the leakproof band have been represented and not all of the cross-sections of these various elements have been represented.

The end walls 6 and 7 generally and advantageously consist essentially of a hardened mass of solidified glue; as the glue it is possible to use quick-setting or slow-setting glues, with 1 or 2 constituents. Alkyl cyanoacrylates may be mentioned as quick-setting glues; epoxy resins may be mentioned as slow-setting glues; however, this is a non-limited list; other glues are mentioned in particular in French Pat. No. 1,307,979. Obviously these glues must be practically resistant to the fluids to be treated.

The ends of the hollow fibres 5 and of the band 3 are, in practice, embedded in the glue forming the walls 6 and 7. In order to produce these end walls 6 and 7, a process which can be used consists of placing the glue in position after the fibres/leakproof band combination has been wound up in a spiral; this addition of glue is preferably carried out by means of a mould, and more particularly by means of a mould made of a flexible material to which the glue does not adhere, for example, silicone. The spirally wound combination (fibres + leakproof band), wound up on the mandrel, is immersed in the vertical position into the mould containing the non-hardened and preferably degassed glue. After the glue has hardened, the mould is removed by any known means.

The end wall 6 and 7 can also be produced by placing the glue in position as the leakproof band and the fibres are wound round the mandrel. In order to produce the walls 6 and 7, it is finally possible to combine the two processes which have just been described.

The unit element of FIG. 1 has been represented equipped also with a holding lattice (or grid) 8 and with two collars 9 and 14, these collars being themselves provided with toroid gaskets 10 and 13. The essential function of the holding lattice is to prevent any floating of the band 3 and of the hollow fibres 5 at the periphery of the coil.

The role of the collars 9 and 14 with their gaskets 10 and 13 is to ensure positioning and leakproofness between the unit element and the jacket in the complete fractionating apparatus according to the invention which apparatus will be described later.

A convenient method of attaching these collars 9 and 14 to the end walls 6 and 7 which they surround is to insert them into the silicone mould mentioned previously, which is used to form the end walls 6 and 7. When the glue has hardened, the mould, which is flexible is removed and the collar remains in place with the glue.

The unit element of FIG. 1 can be used equally well in separating apparatuses and in exchange apparatuses because two different streams of fluids can pass through it. This will be better understood during the explanations which will be given in relation to FIG. 12.

The production of the unit element described above is usually carried out by means of the following operations:

a. Attachment of the hollow fibres to the leakproof band, this attachment preferably being carried out by winding the hollow fibres around the leakproof band; this stage will be described in detail in relation to FIGS. 7 and 8. The attachment may not actually fix the fibres and the band firmly to one another, and in certain cases it suffices to hold fibres and bands juxtaposed in order to carry out the winding of the spiral thereafter. This point will be developed especially in relation to the use of woven fibres.

b. Winding the leakproof band equipped with its hollow fibres in a spiral around a hollow mandrel.

c. Gluing the ends of the spiral cylinder (fibres and leakproof band) in such a way as to produce hardness masses forming the end walls; this stage has already been described above. The gluing can be carried out either by immersing the end of the spiral cylinder in the glue (preferably using a mould) or by spreading quick-setting glue as the spiral coil is formed, at the place where the flat band begins to wind around on the preceding turn, or by combining these two methods. Thus, the operation (c) can be completely or partially concomitant with step (b).

d. Opening the end of the hollow fibres, this opening being preferably carried out by sectioning the ends. This sectioning can be carried out by any known means or equivalent means, for example by means of a circular (or non-circular) saw or by planing or by cutting off the tops. During this sectioning, the mandrel 1 is of course left intact.

The following stages in the production of unit elements according to the invention are optional;

e. Placing a holding lattice in position;

f. Placing a slight excess thickness of glue in position on the periphery of the walls 6 and 7 and placing the collars 9 and 14 in position on this glue, the glue being spread so that the said collars are firmly fixed to the walls 6 and 7 and are in a leakproof relationship with them.

g. Placing the gaskets 10 and 13 in position on the collars; this positioning can be carried out before or after stage (f).

As has been indicated above, the unit element of FIG. 2 comprises hollow fibres which are open at 11 only on one of the end walls 7. The hollow fibres have been represented as having the shape of a U, the rounded part of which is embedded in the wall 6. Such a unit element is produced as described above in relation to FIG. 1, stage (d) of opening the fibres, however, only being carried out on one end of the spiral cylinder [band + fibres + mandrel] produced during the preceding stages.

However, the hollow fibres are not necessarily in the shape of a U as in the present case as they can also be rectilinear, one of their ends being simply embedded in and sealed by the wall 6.

The unit element of FIG. 2 is provided with only a single collar 14 and gasket 13, because it can only be used in separating apparatuses (apparatuses with three inlet and/or outlet passages in the jacket). In fact, as will become more apparent in the description given in relation to FIGS. 9 to 11, the unit element of FIG. 2 only permits on the one hand, flow of fluids outside the hollow fibres, and on the other hand, movement of fluid to inside the hollow fibres, this fluid having permeated through the walls of the hollow fibres from the outside to the inside of these fibres.

In contrast to this unit element of FIG. 2 the unit element of FIG. 1 not only permits these two phenomena (flow of fluid outside the fibres and movement of permeate to the inside), but it also permits two separate flows of different fluids, one outside the fibres and the other inside the fibres.

It is to be noted that the longitudinal slit 2 can be replaced by a plurality of perforations.

Figures 3, 4:
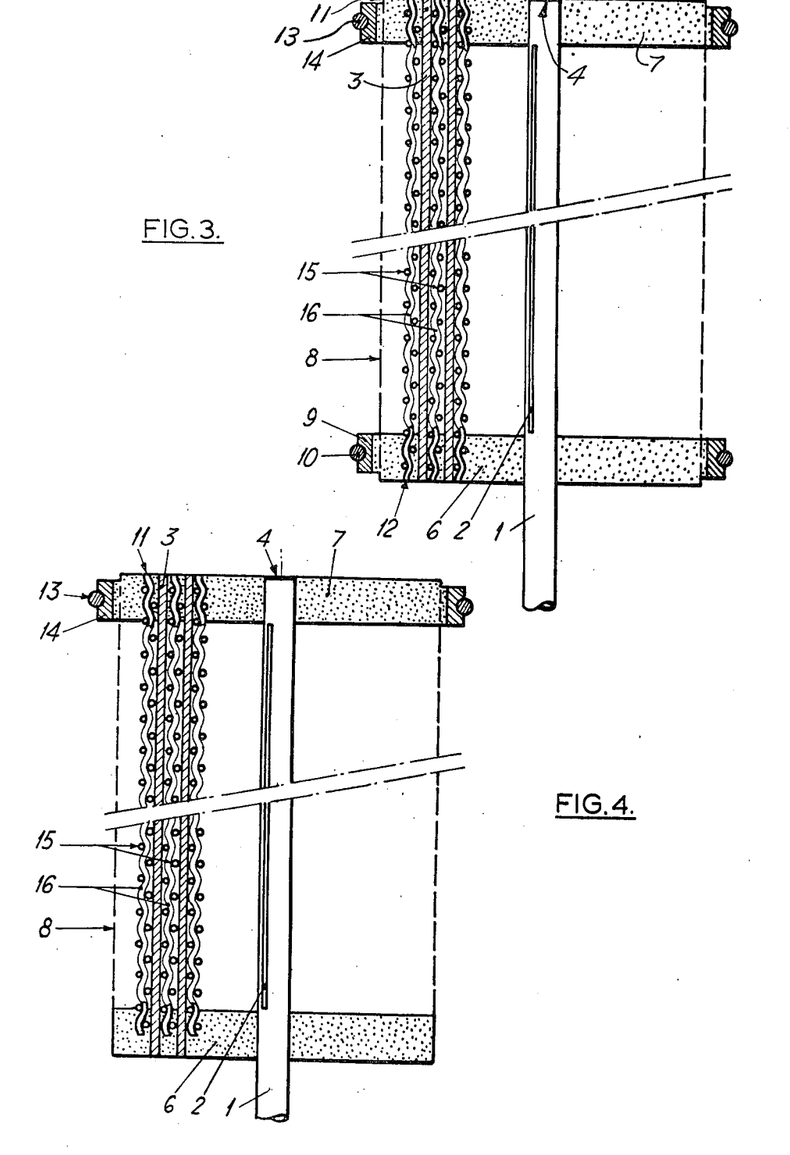

The unit element of FIG. 3 is to a large extent the same as the element described in FIG. 1. It differs therefrom, however, in the following points; the hollow fibres are arranged in the form of a web of criss-crossing or interlaced fibres, preferably a woven web; however, it is also possible for the fibres to be knitted; in the text which follows, for convenience, the expression "web of hollow fibres" will be used.

This web of hollow fibres can consist solely of hollow fibres or of a combination of hollow fibres and solid yarns, the proportion of hollow fibres open at at least one of their ends (this open end opening at one of the edges of the cylinder formed by the web wound up in a spiral with the leakproof band) being generally greater than 50% by number, advantageously greater than 90%, and preferably equal to 100%.

The winding up of the web of hollow fibres in a spiral can be carried out, in the case of woven fibres, either with the warp yarn parallel to the axis of the hollow mandrel, or preferably on the bias. This winding on the bias has the advantage of making it possible for all the fibres (both the weft fibres and the warp fibres) to open on the end walls of the spiral cylinder. Although this winding on the bias is preferred, FIGS. 3 and 4 illustrate a coil with the warp yarn parallel to the axis of the mandrel, this being done for convenience and clarity of the representation.

In FIG. 3, the web of only a few longitudinal hollow fibres 16 and transverse hollow fibres 15 have been represented. Moreover, what is involved is a web in the form of a fabric in which the warp yarn is parallel to the axis of the mandrel, but of course it would also be possible (and even preferred) to use a fabric on the bias relative to the axis of the mandrel. Since the transverse fibres 15 do not end at either of the two walls 6 or 7, it is important that they do not contribute towards flow of fluid between the outside and the inside of the longitudinal hollow fibres 16 which in reality will be the only ones active in the fractionation using the apparatus according to the invention. The transverse fibres 15 are thus in reality inactive fibres and to prevent them from contributing towards flow of fluids, they may be solid fibres, in which case the web of fibres comprises hollow fibres as the weft and solid fibres as the warp, or vice versa or the fibres 15 are also hollow fibres sealed at their ends, for example by gluing cutting, sealing or heat-sealing.

Although the previously described longitudinal fibres 16 are of sinusoidal shape, they are considered with respect to their general direction as substantially parallel to the generatrices of the spiral cylinder.

The process for the production of the unit element of FIG. 3 is by and large the same as the process described in relation to FIG. 1. The essential difference resides in the operation (a), because there is no need actually to fix the hollow fibres firmly to the leakproof band; it suffices to superpose them and thereafter to wind up (stage (b)) this combination consisting of two layers (band + web). These operations overlap, as it were. Finally, and most simply, it is possible to wind up the woven web of hollow fibres and the leakproof band directly and together.

The unit element described in FIG. 4 is to a large extent the same as the element described in FIG. 2. However, it differs therefrom in the same points which distinguish the unit element of FIG. 3 from that of FIG. 1. In other words, the hollow fibres in FIG. 4 form a web, and preferably a woven web.

Figure 5:
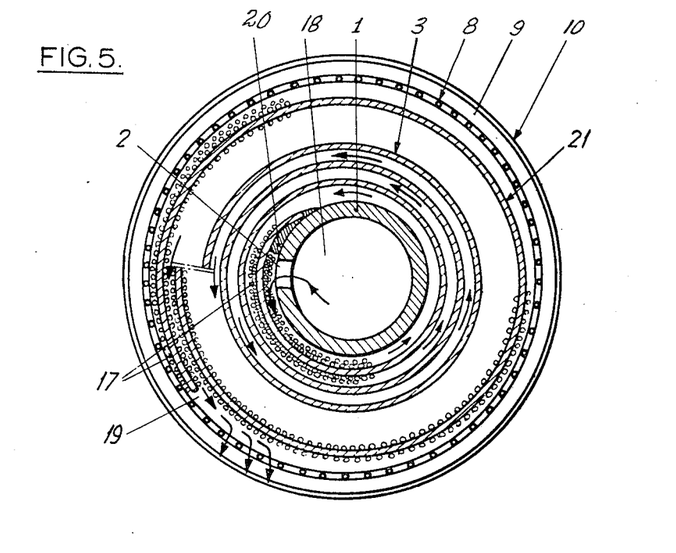
FIG. 5 is a cross-section taken along the line 1—1 of FIG. 1 or along II—II of FIG. 2.
Figure 7:
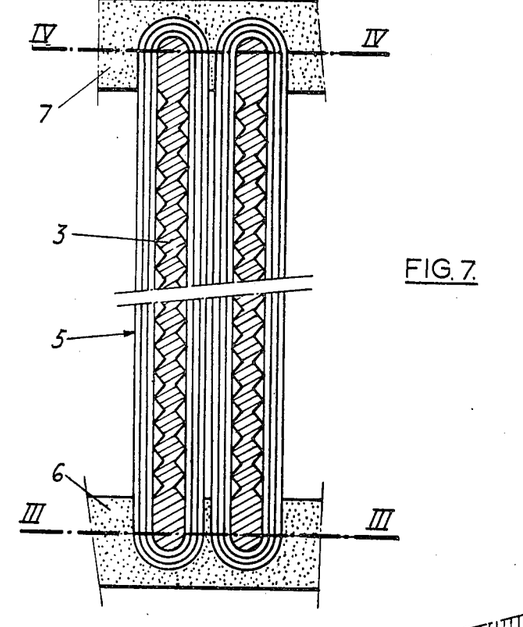
FIG. 7 is a partial view, in cross-section and greatly enlarged, of two consecutive turns of the band of the element of FIGS. 1 or 2, during their manufacture.
Figure 8:
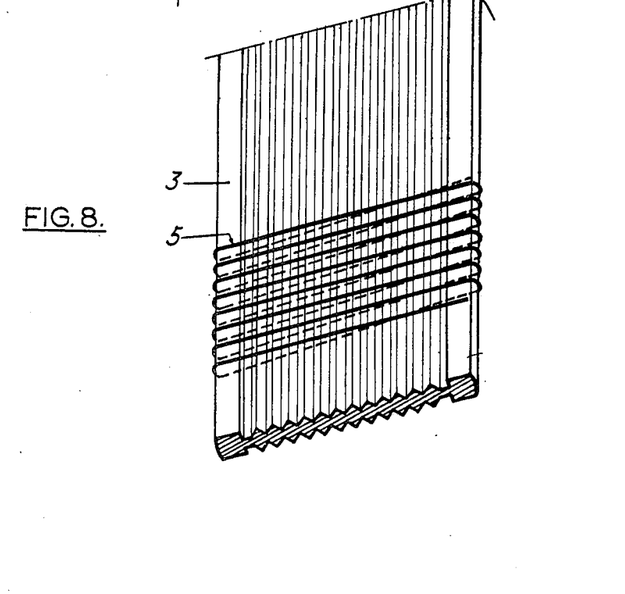
FIG. 8 is a view in perspective showing the relative positions of the fibres and one type of leakproof band, before it is wound up.

FIG. 5 clearly shows the spiral flow of the fluid inside the turns of the unit element and outside the hollow fibres, this flow being perpendicular to the hollow fibres when these active hollow fibres are on the leakproof band as indicated in FIGS. 7 and 8, that is to say when the fibres are in the form of a woven web, the warp yarn of which is parallel to the axis of the mandrel.

When the hollow fibres are in the form of a woven web wound up on the bias on the mandrel, the flow of fluid outside the hollow fibres (and between the turns of the leakproof band) is oblique with respect to these hollow fibres.

In FIG. 5, the small arrows indicate the direction of flow of the fluid, in this case, from the inside 18 of the hollow mandrel 1 to leave the coil at 19 having followed a spiral path between the turns of the leakproof band 3 and across the multiplicity of hollow fibres 17 which have been represented, for the purpose of simplification, only at the beginning and the end of the coil.

After having left from the spiral coil, the fluid passes through the lattice 8.

Of course, the direction of flow of the fluid outside the fibres can be reversed.

The distance between the turns can be either constant or variable from one end of the coil to the other, it being possible for the number of hollow fibres between two turns of the leakproof band to vary correspondingly. By using a flow cross-section (space between two turns) which increases from the mandrel towards the outside of the coil, or vice versa, it is possible to sweep over the hollow fibres at a substantially constant rate.

According to a modification of the invention, the hollow fibres situated outside the last turn 21, between this turn 21 and the holding lattice 8, are dispensed with, because in certain cases, they only play a small part in the fractionation of fluid.

Although the mandrel 1 can be equipped with a multiplicity of perforations and although the leakproof band need not be attached to the mandrel 1, nevertheless, preferably as shown in FIG. 5, the mandrel is formed with a longitudinal slit 2, and the leakproof band 3, at the start of its coil, is also glued longitudinally at 20 to this mandrel 1.

The unit elements of FIGS. 3 and 4 are constructed in the same way as has just been indicated in relation to FIG. 5, with the fibres 17 being replaced, however, by webs of hollow fibres, and preferably woven webs. The hardened mass of glue 20 can, in this case, fulfil the additional role of sealing the ends of inactive hollow fibres that is to say fibres which do not play a part in the fractionation, in accordance with what was mentioned above.

Figure 6:
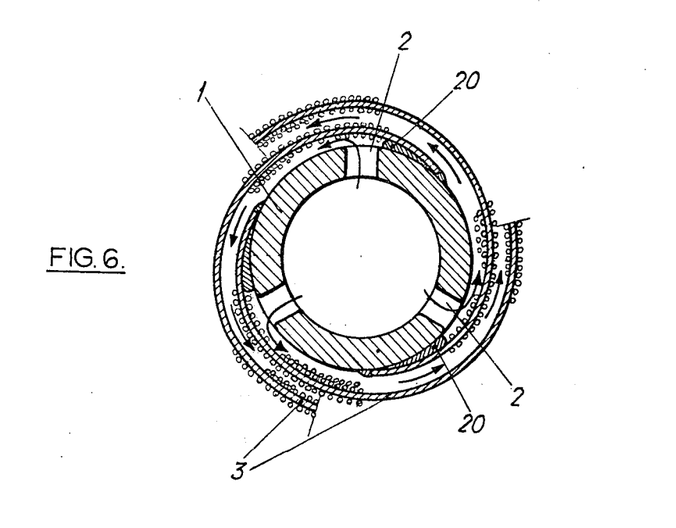
FIG. 6 is a partial view of a different embodiment of a unit element according to FIGS. 1 or 2, (see in cross-section)

FIG. 6 shows a modified unit element. Instead of a single leakproof band 3 provided with its hollow fibres as in FIG. 5, there are three leakproof bands and consequently three fluid circuits between the turns. It is also possible to produce unit elements equipped with two or with more than three leakproof bands.

In FIGS. 7 and 8, the leakproof band 3 is formed with grooves which improve the flow of fluid between the turns. In fact the leakproof band can have any other type of projections, especially ridges or spikes, these projections being intended to create good fluid flow conditions with the external fluid sweeping over the hollow fibres and, consequently, good permeation conditions. These projections can also generate regions of turbulence which promote permeation.

In these FIGS. 7 and 8, the hollow fibres 5, represented by single lines, are wound around the band, in the transverse position, in one or more layers, over the entire length of the band; for simplicity, only a part of this coil has been represented in FIG. 8.

In FIG. 8, the leakproof band is shown still flat. After winding the fibres, the combination is coiled up in a spiral and the ends are glued at the same time, this giving the hardened masses 6 and 7 in FIG. 7. The hollow fibres are opened by sectioning, for example along the planes III—III and/or IV—IV; after this sectioning and removal of the glue at the side, the hardened masses which remain 6 and 7 form the end walls which were mentioned above.

Figure 9:
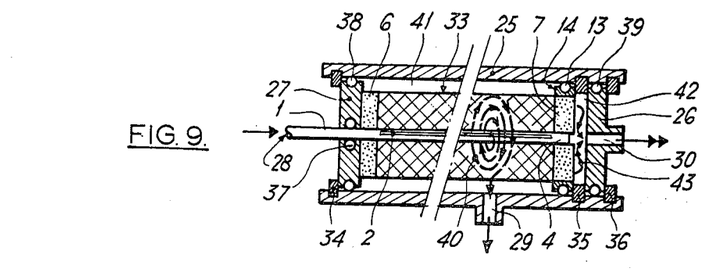
FIGS. 9 to 11 represent cross-sections of fractionation apparatuses according to the invention equipped with unit elements according to FIGS. 2 or 4 as well as with three fluid inlet and/or outlet passages.
Figure 10:
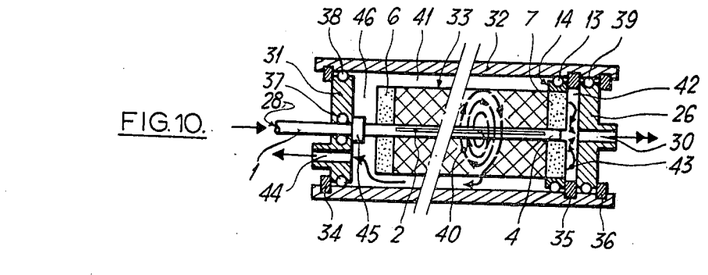
Figure 11:
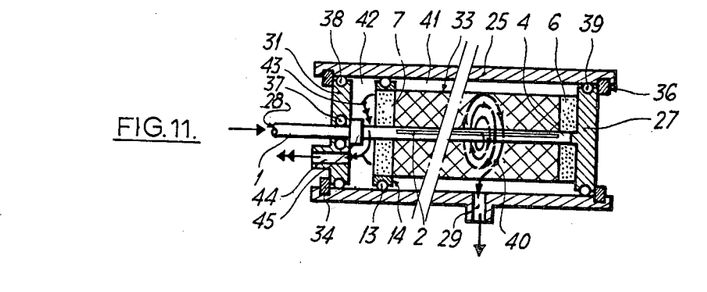

FIGS. 9 to 11 show cross-sections of apparatuses according to the invention equipped with three fluid inlet and/or outlet passages. Such apparatuses are more especially suitable for separation operations (especially ultrafiltration and reverse osmosis), functioning with fluid under pressure flowing outside the fibres.

These three apparatuses of FIGS. 9 to 11 comprise essentially, a jacket and a unit element as described in FIGS. 2 and 4, the jacket itself consisting of a casing and two side-plates, at least one of which is preferably removable.

In the apparatus of FIG. 9, the casing 25 is provided with a lateral tube 29 and the sideplate 26 with a tube 30, the side plate 27 having no tube. The constitutent parts of the unit element include the two end walls 6 and 7, the collar 14 with its toroid gasket 13, the mandrel 1 and the web of hollow fibres, the combination (leakproof band + hollow fibers) wound in a spiral, and this combination is represented by the cross-ruled area and by its outer contour 33. Three open resilient rings 34, 35 and 36 are used to position the side-plates 27 and 26 and the end wall 7. The unit element is fixed by the second end wall 6 abutting the sideplate 27. Leakproof devices 37, 38 and 39, preferably consisting of toroid gaskets, ensure leakproofness between the casing, the mandrel and the side-plates.

In FIGS. 9 to 12 the flow of the fluids to and from the outside of the hollow fibres is represented by arrows with one arrowhead, whilst the flow of the fluids to and from the inside of the hollow fibres is represented by arrows with two arrowheads.

More specifically, in FIG. 9 the flow outside the hollow fibres is represented schematically by the arrow 40. The fluid to be fractionated enters the mandrel 1 at 28, flows from this mandrel through the slit 2 and, following the path 40 passes over the hollow fibres located between the turns of the leakproof band; the fluid to be fractionated then flows from the spiral web and reaches the compartment 41 situated between the casing 25 and the spiral coil 33. Thereafter, it is then withdrawn from the apparatus via the tube 29 which forms part of the casing 25. This fluid path has been represented in this way in order to make the description clear, but of course the direction of flow of the fluid outside the hollow fibres can be reversed, in which case the fluid to be fractionated is supplied via the tube 29 which then becomes an inlet tube (and not an outlet tube) the fluid passing through the spiral coil and being collected in the mandrel 1 to flow out at 28. It should be mentioned here that in all the cases illustrated the mandrel is sealed at one end by an internal partition which is not represented but which is situated at the position 4.

No matter what the variant may be relating to the flow outside the hollow fibres, the fluid flowing inside these same fibres originates from the permeation, through the walls of the fibres, of the liquid flowing on the outside. It flows through the fibres in the direction of their apertures situated in the end wall 7, passes through this wall 7, enters the compartment 42, follows the path of the arrows 43 and flows out via the tube 30.

According to a preferred construction the compartment 42 comprises a porous plate (not shown) in contact with the end wall 7 and the side-plate 26; this plate is sufficiently porous not to disturb the flow of the permeate and, furthermore, it makes it possible to help the end wall 7 withstand the pressure applied outside the hollow fibres. This porous plate can, for example, be made of glass or of sintered metals.

The apparatus described in FIG. 10 is similar, in its essential details, to that of FIG. 9, and it differs therefrom only in the following points:

The casing 25 provided with its lateral tube 29 has been replaced by the casing 32 without a tube; conversely the side-plate 27 without a tube has been replaced by the side-plate 31 provided with an axial tube 44; consequently, it has been necessaryy to form a compartment 46 situated between the end wall 6 and the side-plate 31. The positioning of the various compartments of the apparatus is carried out as above by means of the three open resilient rings 34, 35 and 36, but here in FIG. 10, another device is necessary to position the side-plate 31 relative to the end wall 6 of the unit element. This positioning device can consist of a collar or shoulder 45 on the mandrel; it can advantageously consist of a porous plate (not shown) through the centre of which the mandrel 1 passes and which is placed in contact with the side-plate and the walls 6.

The apparatus described in FIG. 11 also resembles the apparatuses of FIGS. 9 and 10, but has the following characteristics:

The unit element has been turned round so that the end wall 7 containing the open ends of the hollow fibres defines part of the compartment 42 situated between this wall 7 and the side-plate 31. The various parts of the apparatus are positioned by means of the shoulder 45 and the open resilient rings 34 and 36 and the end wall 6 abutting the side-plate 27. The fluid flowing outside the hollow fibres enters the mandrel 1 at 28, passes through the spiral coil following the path 40, is collected in the compartment 41 and is discharged from the apparatus via the tube 29. The fluid flowing inside the hollow fibres passes from the fibres through the wall 7, is collected in the compartment 42, follows the path 43 and leaves the apparatus via the tube 44. As above, the direction of flow of the liquid situated outside the hollow fibres can be reversed. The shoulder 45 can also be replaced advantageously by a porous plate (not shown) occupying the compartment 42.

Figure 12:
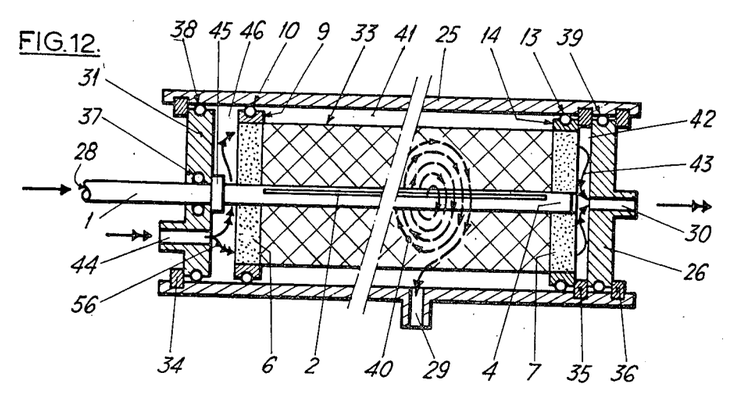
FIG. 12 represents, in cross-section a separating and/or exchange apparatus equipped with a unit element according to FIGS. 1 or 3.

FIG. 12 represents a cross-section of a fractionation apparatus according to the invention, equipped with four fluid inlet and outlet passages. Such an apparatus is suitable either for exchange operations or for separation operations. In exchange operations, the four tubes are advantageously divided into two inlet tubes and two outlet tubes. In separation operations, the four tubes are advantageously divided into one fluid inlet tube and three fluid outlet tubes; the fluid flow arrows shown in FIG. 12 relate to exchange operations.

This apparatus of FIG. 12 consists essentially of a jacket and a unit element as described in FIGS. 1 and 3, the jacekt itself consisting of a casing and two side-plates, at least one of which is preferably removable.

In this apparatus of FIG. 12, the casing is shown at 25 and it is provided with a lateral tube 29. The side-plates 26 and 31 each have an axial tube, 30 and 44 respectively. The constituent parts of the unit element are again present, namely the two walls 6 and 7, the collars 14 and 9 with their toroid gaskets 10 and 13, the mandrel 1 and the spiral coil (band + hollow fibres) which is represented as above by the cross-ruled area and the external contour 33. Three open resilient rings 34, 35 and 36 are used to position the side-plates 26 and 31 and the wall 7. The unit element is fixed by the shoulder 45 to the mandrel 1.

Leakproof devices 37, 38 and 39, consisting preferably of totoid gaskets, ensure leakproofness between the casing, the mandrel and the side-plates.

It should be stated, in relation to this apparatus, that the side-plates thus arranged are removable; it is however possible to replace one of the removable side-plates by a fixed side-plate, for example by dispensing with the gasket 39 and the ring 36, and sealing the side-plate 26 to the casing 25. In an modification the casing 25 and the side-plate 26 are manufactured as a single piece. These considerations relating to the removability of the side-plates also apply in the same way to the apparatuses described in FIGS. 9 to 11.

More specifically, in FIG. 12, the fluid flowing outside the hollow fibres enters the mandrel 1 at 28, flows from the mandrel through the perforations 2, passes between the turns of the leakproof band and around the hollow fibres following the path represented diagrammatically by the arrow 40, is collected in the compartment 41 and is discharged via the tube 29. The fluid flowing into and from the inside of the hollow fibres enters via the tube 44, passes into the compartment 46, enters the hollow fibres passing through the wall 6, leaves the hollow fibres again by passing through the wall 7, is collected in the compartment 42 and is discharged via the tube 30.

These fluid paths have been represented in this way in order to make the account clear, but of course the direction of flow of one and/or the other of the two fluids can be reversed.

In every case, the pressure, if any exists, can be either inside or outside the hollow fibres, depending on the application considered.

When the apparatus of FIG. 12 is to be used in separation operations, the fluid to be fractionated would advantageously enter at 28 and would leave again at 29, whilst the permeate would leave at both ends of the hollow fibres, would pass through each of the two walls 6 and 7 (in opposite directions) to enter the compartments 42 and 46 respectively and would finally leave via the tubes 30 and 44 respectively.

The two compartments 42 and 46, can, where appropriate, be provided with porous plates as indicated above in relation to FIG. 9.

Figures 13A, 13B:
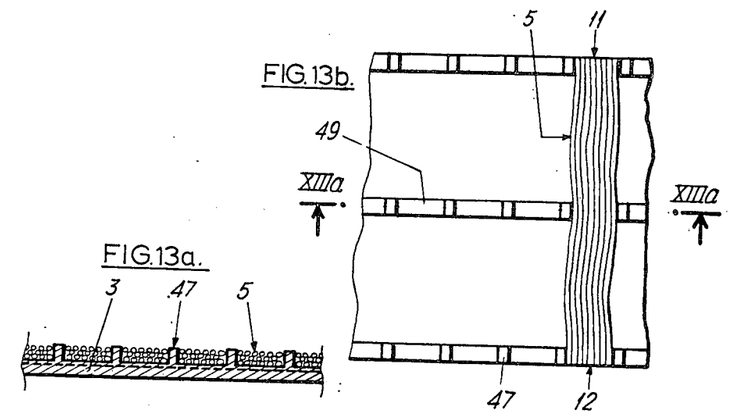

FIGS. 13a and 13b represent respectively a cross-section and a plan view of a portion of leakproof band of special shape on which hollow fibres lie (the cross-section is made at the level XIIa—XIIIa indicated in FIG. 13b). This leakproof band 3 is equipped with crenellations 47 arranged along longitudinal zones, which, in cross-section (FIG. 13a), gives it the form of a rack. In these figures, the leakproof band has been shown provided with three crenellated zones but of course a higher number can also be used. The hollow fibres 5 are located between the crenellations of the zones 49 during assembly. Winding such a leakproof band in a spiral on a mandrel leads, after suitable fixing of the fibre ends, to a unit element as shown in FIG. 14.

Figure 14:
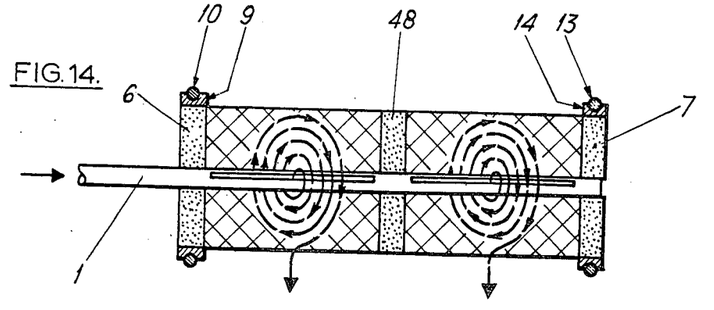
FIG. 14 is a diagrammatic cross-section, through a unit element according to the invention in which the leakproof band has the shape described in FIGS. 13a and 13b.

This unit element of FIG. 14 is similar to that of FIG. 3, but differs therefrom by the presence of the partition 48 which is in fact formed by the combination of the crenellations of the crenellated zone 49 of FIG. 13b. It follows that the unit element is divided into two separate compartments and the spiral path of the fluid flowing outside the hollow fibres can be represented by the two spiral arrows (FIG. 14).

The use of these crenellations makes it possible to keep a constant distance or one which varies uniformly between the turns of the leakproof band; this also makes it possible to improve the flow of fluid outside the hollow fibres.

Of course, the unit element of FIG. 14 can be modified in various ways, thus the hollow fibres can be open at one or both ends and the fluid outside the fibres can flow in the direction from mandrel towards jacket or from jacket towards mandrel.

The body of the fractionation apparatuses according to the invention, in relation especially to the casing, the side-plates, the core and the collars, can be made of any solid, rigid and leak-proof material, and especially of metal or preferably of synthetic polymer.

As has been indicated above, fractionation apparatuses according to the invention can be used in dialysis, ultra-filtration, reverse osmosis and gas permeation; examples of various more precise applications are mentioned in French Pat. No. 1,307,979; the artificial kidney for dialysis and/or ultrafiltration and the artificial lung must be mentioned especially as valuable applications.

The main advantages of the fractionation apparatuses of the invention are the ease with which they can be constructed, the possibilities of producing interchangeable and removable unit elements and the satisfactory way in which the liquid flowing outside the hollow fibres sweeps over these fibres.

Figure 15:
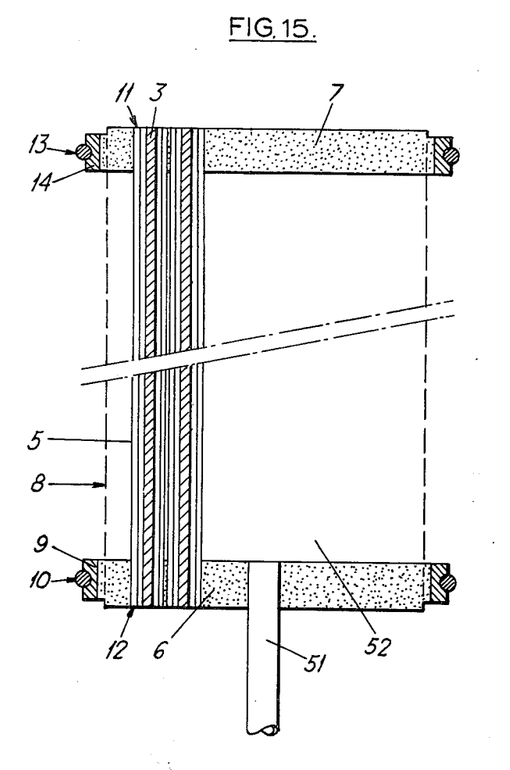
FIG. 15 is a view similar to FIG. 1 of a further embodiment of unit element according to the invention.

The construction of FIG. 15 is similar to that of FIG. 1, and like parts have been accorded like reference numerals. The basic difference between the construction of FIG. 15 and that of FIG. 1, is that there is no central hollow mandrel 1. In place of this mandrel 1, a supply conduit 51 is illustrated passing through an orifice in the end plate 6. Thus, inflowing fluid flows into the inner space 52 within the innermost turn of the spiral.

If desired, a second supply conduit 51 would be passed into an aperture into the opposite end wall 7.

The arrangement having no central mandrel can be employed in the embodiment of any of the other During the course of the construction of the FIG. 15 arrangement, the turns of the spiral can be locked in place by a removable former or by any other suitable means, while the glue of the end walls 6 and 7 set.

We claim:

1. A unit element for use especially in fluid fractionating apparatuses, said unit element comprising, in combination:
   a. at least one band which is leakproof to the fluid to be treated and which is wound up in the form of a spiral cylinder, the turns of this spiral being radially spaced from one another;
   b. a multiplicity of hollow fibers, the majority of which are placed inside the spiral cylinder between its turns;
   c. two end walls substantially perpendicular to the axis of the spiral cylinder located one at each end of the cylinder each of the two walls being firmly fixed to the leakproof band, and to the hollow fibres, at least some of the hollow fibres crossing right through at least one of the end walls and opening on the side of said at least one end wall outside the spiral cylinder; and
   d. means defining an opening in at least one of the end walls to open into the interior of the innermost turn of the spiral, whereby the flow of fluid on the exterior of the hollow fibres is exclusively in a spiral direction.

2. A unit element as claimed in claim 1, wherein a hollow mandrel is passed through said opening, and further comprising means defining at least one perforation in said mandrel, the mandrel being placed at the centre of the spiral cylinder and being parallel to the axis of the cylinder.

3. A unit element as claimed in claim 1, wherein the hollow fibres are open only on one of said end walls.

4. A unit element as claimed in claim 1, wherein the hollow fibres are open on both end walls.

5. A unit element as claimed in claim 1, wherein the end walls consist essentially of a hardened mass of solidified glue.

6. A unit element as claimed in claim 1, and further comprising a holding lattice surrounding and spaced from the outermost turn of said spiral cylinder.

7. A unit element as claimed in claim 2, wherein the perforation in said hollow mandrel is in the form of a longitudinal slit.

8. A unit element as claimed in claim 3, and further comprising a collar surrounding the end wall at the surface of which the hollow fibres open, and a gasket surrounding said collar.

9. A unit element as claimed in claim 4, and further comprising a collar surrounding each end wall, and a gasket surrounding each collar.

10. A unit element as claimed in claim 1, wherein the hollow fibres are arranged in the form of a woven web comprising warp yarns and weft yarns, the warp yarns of which are parallel to the axis of the spiral cylinder.

11. A unit element as claimed in claim 1, wherein the hollow fibres are arranged in the form of a woven web comprising warp yarns and weft yarns, the warp yarns of which are on the bias relative to the axis of the spiral cylinder.

12. A unit element as claimed in claim 1, and comprising a plurality of interwound spiral bands each having a multiplicity of hollow fibres thereon.

13. A unit element as claimed in claim 1, and further comprising at least one projection projecting from the surface of the leakproof band.

14. A unit element as claimed in claim 1, and further comprising at least one crenellation extending longitudinally of the leakproof band.

15. A unit element as claimed in claim 2, wherein the leakproof band is glued to the mandrel.

16. A unit element as claimed in claim 1, wherein the size of the cross-section of the passage defined between two successive turns of the spiral increases from the interior towards the exterior of the spiral.

17. Apparatus for the fractionation of fluids comprising, in combination:
   a. at least one band which is leakproof to the fluid to be treated, and which is wound up in the form of a spiral cylinder, the turns of this spiral being radially spaced from one another;
   b. a multiplicity of hollow fibres, the majority of which are placed inside the spiral cylinder between its turns;
   c. two end walls substantially perpendicular to the axis of the spiral cylinder located one at each end of the cylinder each of the two walls being firmly fixed to the leakproof band, and to the hollow fibers, at least some of the hollow fibres crossing right through at least one of the end walls and opening on the side of said at least one end wall outside the spiral cylinder;

d. means defining an opening in at least one of the end walls to open into the interior of the innermost turn of the spiral;
e. a jacket surrounding said spiral cylinder;
f. at least one fluid inlet passage for the jacket:
g. at least one fluid outlet passage, one of said inlet passage and said outlet passage being connected to said opening, whereby the flow of fluid on the exterior of the hollow fibres is exclusively in a spiral direction.

18. Apparatus as claimed in claim 17, wherein said jacket comprises a casing and two side-plates, at least one of which is removable.

19. Apparatus as claimed in claim 18, wherein the casing and one side-plate are each equipped with a fluid inlet and/or outlet tube.

20. Apparatus as claimed in claim 18, wherein the two side-plates are each provided with a fluid inlet and/or fluid outlet tube.

21. Apparatus as claimed in claim 18, wherein the two side-plates and the casing are each provided with an inlet and/or outlet tube.

22. A method for making a unit element which can be used especially in fluid fractionating apparatus, said method comprising the steps of:
a. winding a plurality of hollow fibres around a leakproof band;
b. coiling said leakproof band together with the hollow fibres into a cylindrical spiral;
c. gluing the ends of the spiral cylinder thus produced; and
d. cutting the ends of the hollow fibres.

* * * * *